United States Patent [19]

Mackenzie

[11] Patent Number: 4,771,108

[45] Date of Patent: Sep. 13, 1988

[54] POLYMERIC FILM

[75] Inventor: Moray W. Mackenzie, Oospvoorne, Netherlands

[73] Assignee: Imperial Chemical Industries PLC, London, England

[21] Appl. No.: 864,924

[22] Filed: May 20, 1986

[30] Foreign Application Priority Data

May 20, 1985 [GB] United Kingdom ................. 8512688

[51] Int. Cl.$^4$ .............................................. C08L 67/02
[52] U.S. Cl. ..................................... 525/92; 525/166; 525/176; 264/210.1; 428/910
[58] Field of Search ................. 428/910; 525/166, 92, 525/176; 264/210.1

[56] References Cited

U.S. PATENT DOCUMENTS

| 3,435,093 | 3/1969 | Cope | 525/176 |
| 3,579,609 | 5/1971 | Sevenich | 525/177 |
| 4,187,358 | 2/1980 | Kyo et al. | 525/132 |
| 4,219,628 | 8/1980 | Wiemes | 525/166 |
| 4,368,295 | 1/1983 | Newton | 525/166 |

FOREIGN PATENT DOCUMENTS

| 0056449 | 7/1982 | European Pat. Off. |
| 0119150 | 9/1984 | European Pat. Off. |
| 1211124 | 11/1970 | United Kingdom |

Primary Examiner—Patricia Short
Attorney, Agent, or Firm—Cushman, Darby & Cushman

[57] ABSTRACT

A flex-resistant oriented polyester film comprises a blend of a linear polyester, an incompatible resin and an ionomer resin.

10 Claims, No Drawings

POLYMERIC FILM

BACKGROUND OF THE INVENTION (a) Technical Field of Invention

This invention relates to a polymeric film and, in particular, to a linear polyester film exhibiting improved flex-crack resistance.

(b) Background of the Art

Oriented films of linear polyesters, such as polyethylene terephthalate, are of utility in a wide range of applications including magnetic recording media—such as tapes and discs, as supporting substrates for light-sensitive emulsions, pressure-sensitive adhesives and metallic layers, as decorative drapes and electrical insulants, and particularly as packaging films.

In certain circumstances, in which an oriented polyester film is subjected to repeated flexing, the film structure may crack or develop pin holes which detract from the moisture and gas barrier characteristics of the film and may eventually lead to total failure of the film. It has therefore been proposed in U.S. Pat. No. 3,579,609 to improve the flex resistance of a biaxially oriented polyethylene terephthalate film by incorporating therein a minor amount of a solid, fusible heat-stable additive polymer comprising a polymer of a lower alpha mono-olefin such as ethylene, propylene, butylene and 4-methyl pentene, or an ethylene-vinylacetate copolymer, or polytetramethylene oxide.

We have now devised a polyester film exhibiting improved flex-crack resistance.

SUMMARY OF THE INVENTION

Accordingly, the present invention provides an oriented polyester film comprising a blend of a linear polyester, a resin incompatible with the linear polyester, and an ionomer resin.

The invention also provides a method of producing an oriented polyester film comprising forming a blend of a linear polyester, a resin incompatible therewith, and an ionomer resin, forming an extrudate of the molten linear polyester containing the incompatible resin and ionomer resin, quenching the extrudate, and then orienting the quenched extrudate in at least one direction.

By an "incompatible resin" is meant a resin which either does not melt, or which is substantially immiscible with the linear polyester, at the highest temperature encountered during extrusion and fabrication of the polyester film. An oriented film comprising a linear polyester and an incompatible resin will usually be voided and opaque.

DETAILED DESCRIPTION AND PREFERRED EMBODIMENTS OF THE INVENTION

A synthetic linear polyester suitable for use in the formation of a film according to the invention may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, eg ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British Pat. No. 838 708.

As hereinbefore defined, an incompatible resin suitable for use in accordance with the invention should remain substantially unmelted, or substantially immiscible with the linear polyester, at the highest temperature encounted during extrusion and subsequent treatments of the polyester film. Incompatible resins disclosed in the art as being suitable for blending with polyethylene terephthlate include polyamides and various olefin polymers. A preferred resin for use in accordance with the invention comprises a homo- or co-polymer of an alpha mono olefin containing up to 6 carbon atoms in its molecule—such as, ethylene, propylene, butene-1 and 4-methylpentene-1, or mixtures thereof.

To improve film crack-resistance the incompatible polymer desirably exhibits a relatively low Melt Flow Index (MFI). A suitable incompatible olefin polymer typically has a granular MFI (230° C.; 2.16 kg) of less than 10, preferably less than 7.5, and particularly preferably from about 5.0 to 0.1. Desirably, the Melt Viscosity (at 275° C.) of the incompatible resin and that of the linear polyester are in a ratio of at least 2:1, preferably at least 3:1, and particularly preferably in a range from 20:1 to 30:1.

A particularly suitable incompatible resin comprises a high molecular weight propylene-ethylene block copolymer containing up to 10%, preferably from 2 to 7%, by weight of ethylene, and having a Melt Flow Index (230° C.: 2.16 kg), measured according to ASTM-D 105C, of from about 0.1 to 0.75, preferably from 0.2 to 0.5. A typical resin comprises a propylene-ethylene block copolymer containing about 6% by weight of ethylene, and having a Melt Flow Index of about 0.3.

An ionomer resin comprises an olefin polymer containing pendant carboxylate groups associated with a mono- or poly-valent cation. Such resins usually comprise an ethylene/(meth)acrylic co- or ter-polymer partially neutralised to produce, for example, a sodium or zinc salt, and have a Melt Flow Index (190° C.: 2.16 kg) of from about 0.3 to 15, preferably from 1.5 to 5.0. A suitable resin comprises SURLYN 1605 (DuPont) having a Melt Flow Index of about 2.8.

The amount of incompatible resin and ionomer resin employed in the formation of a film according to the invention may vary over a wide range, depending on the desired film characteristics, but, in general, the incompatible and ionomer resins will together comprise a minor (ie less than 50% by weight) proportion of the blend. Preferably, the combined incompatible and ionomer resin concentration will comprise from 0.1 to 35%, particularly from about 2 to 30% and especially from 7 to 15% by weight of the total blend.

The concentration of the ionomer resin is preferably in a range of from about 0.5 to 75%, preferably from 10 to 50%, by weight of the incompatible resin.

Mixing of the resin components of the blend may be effected by conventional blending techniques, for example—by thoroughly mixing the resin components in powder or granular form in a tumbler blender. Preferably, the incompatible and ionomer resins are precompounded in appropriate proportions prior to blending with the linear polyester. Alternatively, the incompatible and/or ionomer resin may be fed to the extruder from which the linear polyester is extruded to form a film.

A film according to the invention may be uniaxially oriented, but it preferably biaxially oriented by drawing in two mutually perpendicular directions in the plane of the film to achieve a satisfactory combination of mechanical and physical properties. Formation of the film may be effected by any process known in the art for producing an oriented polyester film—for example, a tubular or flat film process.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a polymer blend is extruded through a slot die and rapidly quenched upon a chilled casting drum to ensure that the polyester component is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, ie the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is usually effected so that the dimension of the oriented polyester film is from 2.5 to 4.5 its original dimension in the, or each, direction of stretching.

A stretched film may be, and preferably is, dimensionally stabilised by heat-setting under dimensional restraint at a temperature above the glass transition temperature of the film-forming polyester but below the melting temperature thereof, to induce crystallisation of the polyester.

A film according to the invention may, if desired, be subjected to a chemical or physical surface-modifying treatment to improve the bond between that surface and a subsequently applied coating layer. A preferred treatment, because of its simplicity and effectiveness, is to subject the exposed film surface to a high voltage electrical stress accompanied by corona discharge. Alternatively, the film may be pretreated with an agent known in the art to have a solvent or swelling action on a polyester film. Examples of such agents include a halogenated phenol dissolved in a common organic solvent eg a solution of p-chloro-m-cresol, 2,4-dichlorophenol, 2,4,5- or 2,4,6-trichlorophenol or 4-chlororesorcinol in acetone or methanol.

The film may, if desired, conveniently contain any of the additives conventionally employed in the manufacture of thermoplastics polyester films. Thus, agents such as dyes, pigments, fillers, voiding agents, lubricants, anti-oxidants, anti-blocking agents, surface active agents slip, aids, gloss-improvers, prodegradants, ultraviolet light stabilisers, viscosity modifiers and dispersion stabilisers may be incorporated, as appropriate.

Films in accordance with the invention may be prepared in a range of thicknesses governed primarily by the ultimate application for which a particular film is to be employed. Films, having a total thickness in a range extending from 2.5 to 250 microns are of general utility, although for packaging applications a packaging film or from about 10 to 50 microns in total thickness is generally suitable.

Although incorporation of an incompatible resin usually yields an opaque, voided polyester film, the films of the invention are observed to be substantially transparent and free from voids. It appears that the ionomer resin may produce a degree of chemical bonding between the incompatible resin and the polyester matrix, whereby the well-dispersed incompatible resin acts as a focus for the distribution of applied stress. By avoiding concentration of stress at specific points the incidence of pinhole defects at these points is reduced or eliminated.

The films may be employed in the virgin state. Alternatively, the films may serve as substrates for a variety of coating compositions including priming media—such as (meth)acrylic polymers and copolymers and styrene-maleic anhydride copolymers, light-sensitive photographic emulsions, magnetic recording media, pressure-sensitive adhesives and metallic layers.

The propensity of the films to develop pinhole defects on repeated flexing was assessed using a Gelbo flex tester. The latter comprises a pair of axially opposed circular jaw heads of 90 mm diameter, one head remaining stationary while the opposed movable head is simultaneously advanced a distance of 140 mm towards the stationary head and rotated through an angle of 400° about the axis of the tester, and then returned to its original position. Advancement, rotation, retraction and counter-rotation of the movable head constitutes one cycle, and the tester is operated at a speed of 40 cycles/minute. In the test, a sheet of film of A4 dimensions (ie approximately 210×297 mm), is formed into a cylindrical tube, the opposed ends of which are gripped in the respective jaw heads of the tester. The film is then flexed for 1000 cycles. Pinholes formed in the film by flexing are detected by placing the tested flat film sample on a sheet of diazo paper, and rubbing the exposed film surface with a solution of 0.88 ammonia. Pinholes in the film are revealed by the appearance of corresponding blue spots on the diazo paper, and are readily counted.

The invention is illustrated by reference to the accompanying Examples.

EXAMPLE 1

This is a comparative Example, not according to the invention.

Granules of polyethylene terephthalate and a propylene-ethylene block copolymer containing 6% by weight of ethylene and having a Melt Flow Index of 0.3 (230° C.: 2.16 kg) were tumble blended to yield a blend containing 10% by weight of the propylene-ethylene copolymer.

The blend was extruded as a flat extrudate, rapidly quenched to render the polyester component amorphous and then stretched at a temperature of about 100° C. to about 3.5 times its original dimensions in each of two mutually perpendicular directions. The oriented film was heat-set at constant dimensions at a temperature of about 215° C.

The resultant film had an opaque, voided appearance and had a thickness of about 20 microns, a bulk density of about 1.04 g/cc and an Optical Density (McBeth densitometer) of about 0.10D.

When the film was tested on a Gelbo flex tester, as hereinbefore described, the number of pinholes developed in a sheet of A4 dimensions (average of 5 test samples) was 16.

EXAMPLES 2 TO 6

The procedure of Example 1 was repeated save that the propylene-ethylene copolymer component of the film-forming polymer blend was respectively replaced by a mixture of the same propylene-ethylene copolymer and varying amounts of SURLYN 1605 (a DuPont ionomer resin). The combined propylene-ethylene copolymer and ionomer resin comprised 10% by weight of the film-forming blend in each case.

Results are tabulated below:

TABLE

| Example | Ionomer resin (% by weight on propylene-ethylene copolymer) | Pinholes/1000 cycles (Average of 5 Samples) | Bulk Density g/cc | Optical Density |
|---|---|---|---|---|
| 1 | 0 | 16 | 1.04 | 0.10 |
| 2 | 1 | 5 | 1.14 | 0.07 |
| 3 | 5 | 3 | 1.30 | 0.04 |
| 4 | 10 | 3 | 1.30 | 0.04 |
| 5 | 20 | 1 | 1.30 | 0.04 |
| 6 | 50 | <1 | 1.30 | 0.04 |

EXAMPLE 7

The procedure of Example 4 was repeated save that the combined content of copolymer and ionomer resin was reduced to 5% by weight of the film-forming blend (the ionomer comprising 10% by weight of the propylene-ethylene copolymer).

The number of pinholes/1000 cycles (average of 7 samples) was 3.

EXAMPLES 8 TO 11

To investigate the influence of different ionomer resins, the procedure of Example 1 repeated save that the propylene-ethylene copolymer was used in conjunction with various ionomer resins as recorded in the accompanying Table, the combined content of copolymer and ionomer resin comprising 10% by weight of the film-forming blend in each case.

TABLE

| Example | Ionomer Resin Resin* | Ionomer Resin wt % on copolymer | Film Thickness (Microns) | Pinholes/1000 flexes (average of 5 samples) |
|---|---|---|---|---|
| 8 | 1605 | 5 | 16 | 2 |
| 9 | 1702 | 5 | 16 | 2 |
| 10 | 1605 | 10 | 19 | 3 |
| 11 | 1856 | 10 | 19 | 2 |

*1605: SURLYN 1605 (DuPont); Ion Type: Sodium
1702: SURLYN 1702 (DuPont); Ion Type: Zinc
1856: SURLYN 1856 (DuPont); Sodium-based terpolymer The ionomer resin employed in Example 11 conferred a slight improvement in flex characteristics.

EXAMPLES 12 TO 15

To investigate the influence of polymer viscosity, the procedure of Example 1 was repeated save that the ionomer resin (SURLYN 1605) was used respectively in conjunction with propylene polymers of different flow characteristics as identified in the accompanying Table, the combined content of polypropylene and ionomer resin (10 wt % on polypropylene) comprising 10% by weight of the film-forming blend in each case.

| Example | Polypropylene Resin MFI* | Polypropylene Resin MV** | Film Thickness (Microns) | Pinholes/1000 flexes (average of 5) | Optical Density | Bulk Density g/cc | Wide Angle Haze (%) |
|---|---|---|---|---|---|---|---|
| 12 | 0.3 | 3056 | 19 | 3 | 0.05 | 1.3 | 45 |
| 13 | 4.0 | 335 | 23 | 4 | 0.05 | 1.3 | 42 |
| 14 | 7.5 | 272 | 22 | 5 | 0.06 | 1.3 | 41 |
| 15 | 22.0 | 139 | 23 | 8 | 0.06 | 1.3 | 48 |

*MFI: Granule melt flow index (230° C.; 2.16 kg)
**MV: Melt viscosity ((Pa.s) at 275° C. MV of the polyethylene terephthalate resin is 121 Pa.s at 275° C. It is evident that improved flex performance is achieved by reducing the melt flow index of the copolymer resin.

I claim:

1. An oriented, transparent, polyester film of improved flex-crack resistance comprising a blend of a polyethylene terephthalate resin, a polyolefin resin incompatible with the polyethylene terephthalate resin and an ionomer resin which comprises an olefin polymer containing pendant carboxylate groups associated with a mono- or poly-valent cation, the melt viscosity at 275° C. of the incompatible resin and that of the polyethylene terephthalate resin being in a ratio of at least 2:1.

2. A film according to claim 1 wherein the incompatible resin and the ionomer resin together comprise from 0.1 to 35% by weight of the blend.

3. A film according to claim 1 wherein the concentration of the ionomer resin is from 0.5 to 75% by weight of the incompatible resin.

4. A film according to claim 1 wherein the incompatible resin is a homo- or a co-polymer of a alpha monoolefin containing up to 6 carbon atoms in its molecule.

5. A film according to claim 4 wherein the incompatible resin is a propylene-ethylene block copolymer containing up to 10% by weight of ethylene.

6. A film according to claim 1 wherein the ionomer resin is a partially neutralised ethylene/(meth)acrylic co- or ter-polymer.

7. A biaxially oriented polyester film according to claim 1 comprising a blend of polyethylene terephthalate and from 0.1 to 35%, by weight of the blend, of a mixture of a propylene-ethylene block copolymer containing 2 to 7% by weight of ethylene and an ionomer resin wherein, the concentration of the ionomer resin is from 10 to 50% by weight of the propylene-ethylene block copolymer.

8. A method of producing an oriented polyester film according to claim 1 comprising forming a blend of a linear polyester, a resin incompatible therewith, and an ionomer resin, forming an extrudate of the molten linear polyester containing the incompatible resin and ionomer resin, quenching the extrudate, and orienting the quenched extrudate in at least one direction.

9. A method according to claim 8 comprising precompounding the incompatible resin and ionomer resin, tumble blending the compounded resins with the linear polyester, and extruding the blend.

10. A biaxially oriented polyester film according to claim 1, said film having an optical density of from 0.04 to 0.07.

* * * * *